United States Patent [19]

Ehrlich

[11] Patent Number: 4,943,204

[45] Date of Patent: Jul. 24, 1990

[54] DROP FRAME TRAILER CONSTRUCTION

[76] Inventor: Rodney P. Ehrlich, 1903 Tippecanoe Springs Rd., Monticello, Ind. 47960

[21] Appl. No.: 277,958

[22] Filed: Nov. 30, 1988

[51] Int. Cl.⁵ .............................................. B60P 1/02
[52] U.S. Cl. .................................... 414/495; 410/29.1; 187/8.71; 187/18; 187/19; 187/92
[58] Field of Search ..................... 414/495, 496, 497; 410/24, 24.1, 26, 29.1; 187/8.71, 18, 19, 92

[56] References Cited

U.S. PATENT DOCUMENTS

| | | | |
|---|---|---|---|
| 613,942 | 11/1898 | Rowan | 187/19 |
| 636,445 | 11/1899 | McCabe et al. | 187/18 |
| 1,003,050 | 9/1911 | Kenyeres | 187/92 |
| 1,350,087 | 8/1920 | Trapp | 187/19 X |
| 1,405,301 | 1/1922 | DeVol | 187/19 |
| 2,233,055 | 2/1941 | Kennedy | 410/26 |
| 4,113,119 | 9/1978 | Brown et al. | 187/92 X |
| 4,149,472 | 4/1979 | Naves et al. | 410/26 |

FOREIGN PATENT DOCUMENTS

| | | | |
|---|---|---|---|
| 0153032 | 8/1985 | European Pat. Off. | 414/495 |
| 0219151 | 4/1987 | European Pat. Off. | 414/495 |
| 0604156 | 9/1934 | Fed. Rep. of Germany | 187/8.71 |
| 1269660 | 7/1961 | France | 414/495 |

Primary Examiner—Robert J. Spar
Assistant Examiner—John Vanden Bosche
Attorney, Agent, or Firm—Richard Bushnell

[57] ABSTRACT

A drop frame floor assembly for use in a trailer or other such vehicle which includes a frame assembly, a floor assembly and a lift assembly. The lift is connected to the frame for elevating and lowering the floor assembly with respect to the frame. The lift includes first and second scissor assemblies secured between the frame and floor assembly and hydraulic actuators for actuating the scissor assembly.

11 Claims, 5 Drawing Sheets

DROP FRAME TRAILER CONSTRUCTION

BACKGROUND OF THE INVENTION

The present invention relates to a drop frame trailer body and more specifically to a novel floor construction having a hydraulic or pneumatic lift assembly for adjusting the position of the floor assembly.

There are many types of trailers described in the prior art suitable for transporting cargo. However, for the most part, these trailers do not include adjustable floor assemblies. Usually, a trailer is loaded and unloaded from the ground or a loading dock. The standard height of such loading dock is approximately 4' high. Although, the height of these loading docks certainly can vary substantially.

Obviously, when the height of the floor of the trailer differs from the level of the loading point, the task of loading and/or unloading the trailer becomes burdensome.

Accordingly, a general object of the present invention is to provide a new and improved floor assembly, for use in a trailer or other such vehicle which assembly can facilitate the loading and/or unloading of the trailer.

A more particular object of the present invention is to provide a novel floor construction which can be readily raised or lowered to meet the level of a loading dock.

Another object of the present invention is to provide a novel floor assembly which can be raised and lowered by a hydraulic or pneumatic lift assembly.

These and other objects and features of the present invention will become more apparent upon consideration of the following descriptions.

SUMMARY OF THE INVENTION

The vehicle of the present invention comprises a frame means, a floor assembly and a lift means for elevating and lowering the floor assembly with respect to the frame means. The lift means include first and second scissor means secured between the frame means and floor assembly and means for actuating the scissors means for selectively raising and lowering the floor assembly.

BRIEF DESCRIPTION OF THE DRAWING

The features of the present invention which are believed to be novel are set forth with particularity in the appended claims. The organization and manner of operation of the invention, together with further objects and advantages thereof, may best be understood by reference to the following description taken in connection with the accompanying drawings in which:

DETAILED DESCRIPTION OF THE PREFERRED EMBODIMENT

Figure 1:
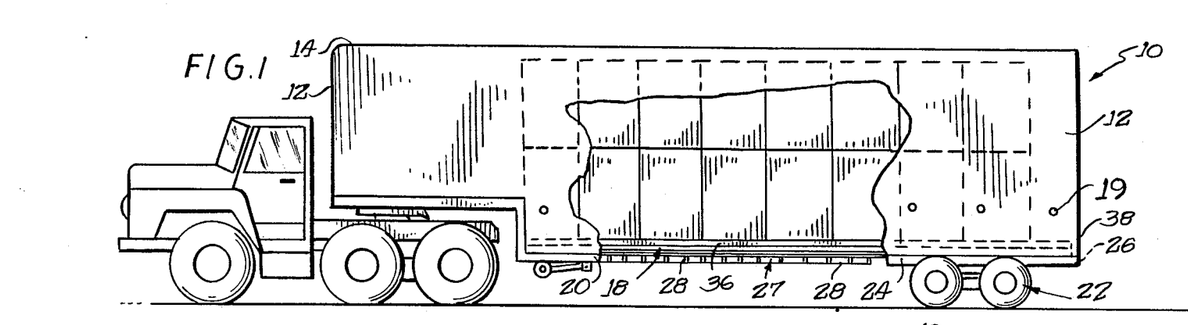
FIG. 1 is a side elevational view partially broken away, showing a trailer body structure incorporating features of one embodiment of the present invention.
Figure 2:
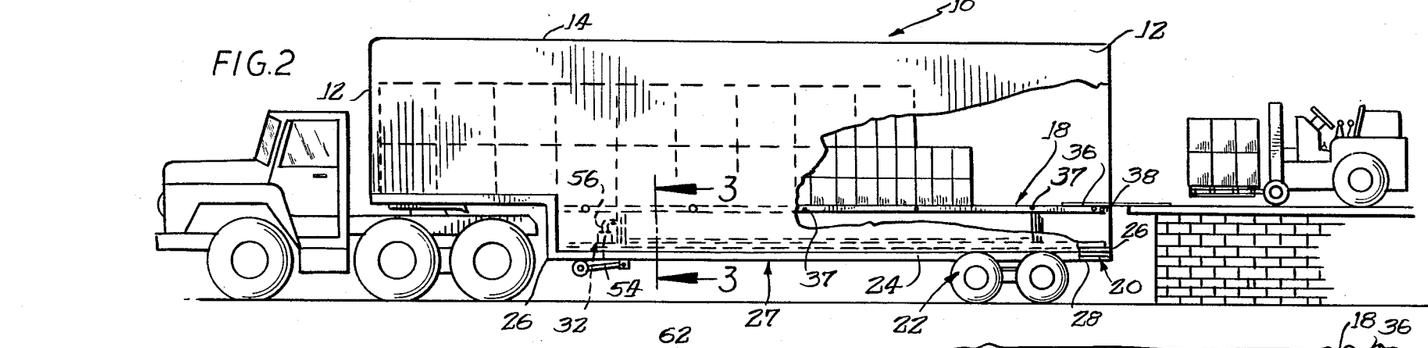
FIG. 2 is a side elevational view of FIG. 1 partially broken away, showing the floor assembly of the trailer body raised to the level of a loading dock.

Turning to the drawings, wherein the components are designated by like reference numerals throughout the various figures, a drop frame trailer body, constructed in accordance with the present invention, is illustrated in FIGS. 1 and 2 and generally designated by reference numeral 10.

The trailer body 10, includes rectangular side panels 12, a top panel or roof 14 supported on a plurality of transversely extending and spaced apart I-beams or similar beams (not shown), and a floor assembly 18. The side panels 12 have a plurality of appropriately spaced apertures 19. The apertures 19 will be discussed below. The trailer body 10 and floor assembly 18 are secured by suitable means on top of a rectangular frame assembly 20, which is in turn suitably attached to a wheel assembly 22.

Figure 3:
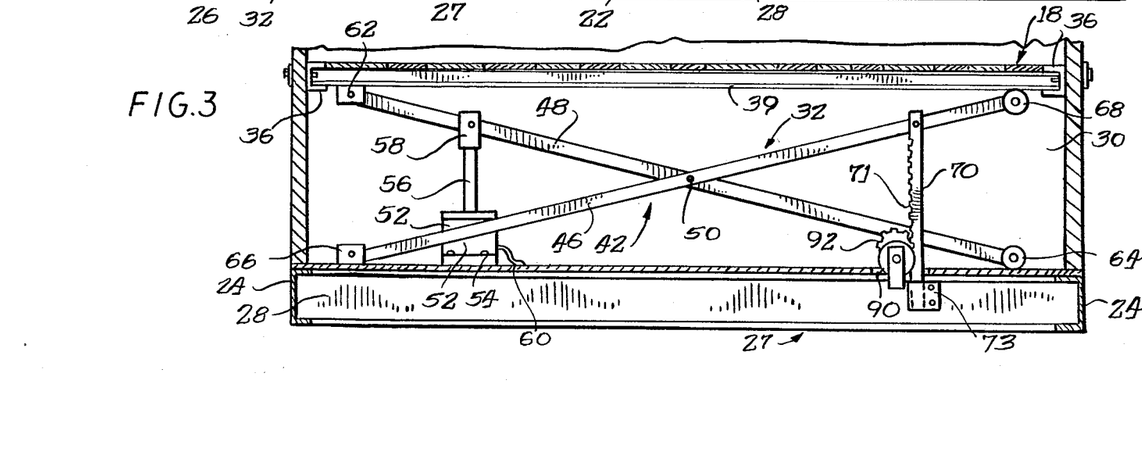
FIG. 3 is an enlarged fragmentary sectional view taken along line 3—3 of FIG. 2
Figures 4, 5, 6, 7:
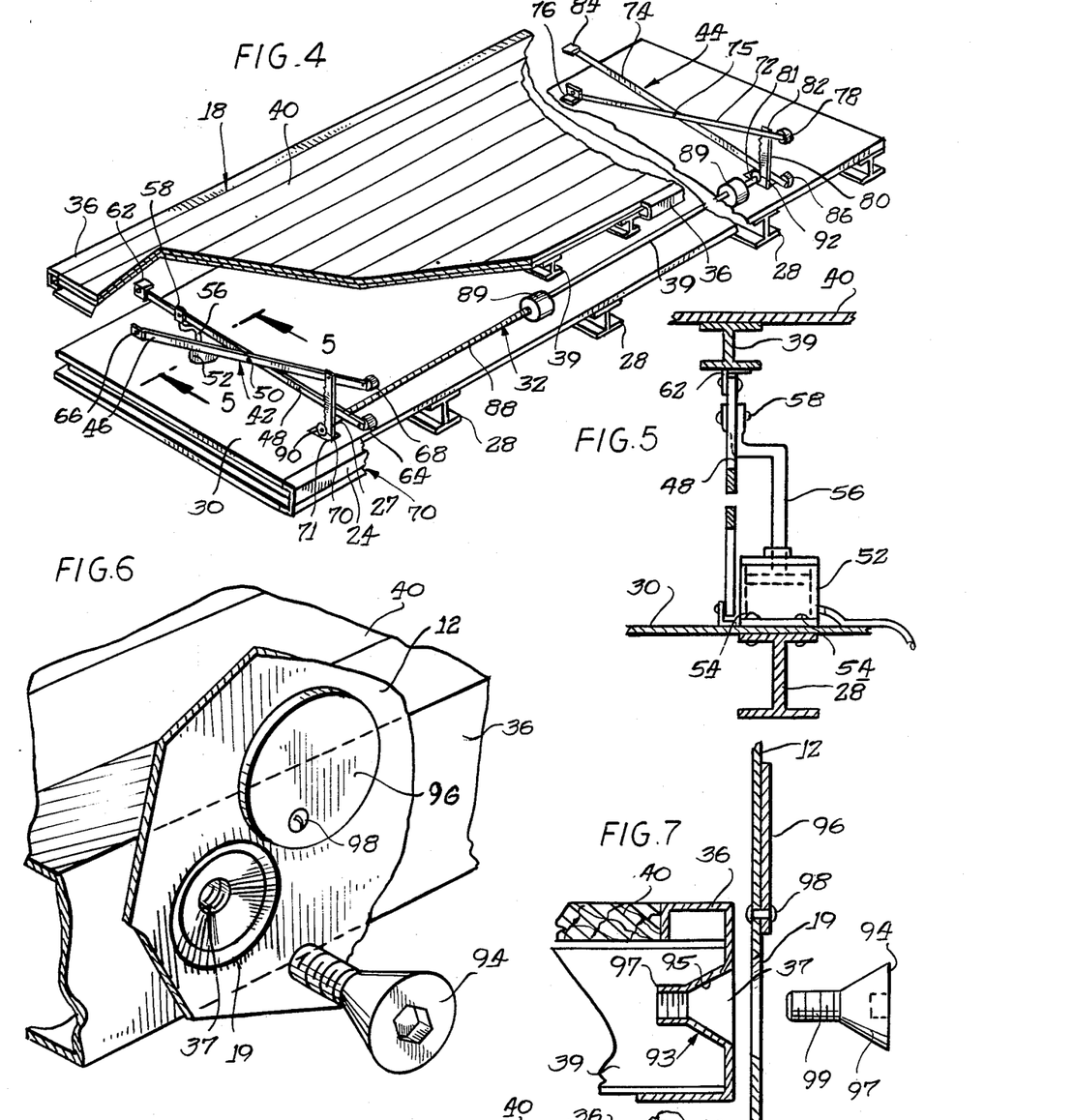
FIG. 4 is an enlarged partially fragmentary perspective view showing the floor assembly and a portion of the frame assembly.
FIG. 5 is an enlarged fragmentary sectional view taken along line 5—5 of FIG. 4.
FIG. 6 is an enlarged fragmentary perspective view showing a cover plate assembly.
FIG. 7 is an exploded partial sectional view showing a portion of the cover plate assembly.

As shown best in FIGS. 3 and 4, the frame assembly 20 includes a pair of longitudinally extending and laterally spaced apart side rails 24 which are suitably joined at their common opposite ends by transverse end members 26 thereby defining a substantially rectangular frame 27. A plurality of transversely extending I-beams or similar beams 28 are spaced longitudinally and welded or otherwise suitably joined at their opposite ends to the side rails 24.

A thin sheet member 30 as best shown in FIGS. 3 and 4, preferably made of a thin metal sheet such as aluminum or the like, seats on top of said I-beams 28. The sheet member 30 is substantially rectangular in shape and serves as a weather shield Turning now to FIGS. 3 and 4, there is shown a hydraulic or pneumatic lift assembly 32 which seats on top of the thin sheet member 30. The lift assembly will be described in detail below.

As shown in FIGS. 3 and 4, the floor assembly 18 includes a pair of longitudinally extending and laterally spaced apart floor side rails 36 which are joined at their common opposite ends by suitable means such as transverse floor end members 38 thereby defining a substantially rectangular frame. A plurality of transversely extending I-beams or similar floor beams 39 are spaced longitudinally of the frame and are suitably joined to side rails 36 as shown in FIG. 4.

In addition, as shown in FIG. 2, there are a plurality of preformed apertures 37 appropriately spaced in side rails 36. The purpose of these apertures will be described in detail below.

A plurality of floor boards 40 are spaced transversely of said floor beams 38 and are suitably bolted or secured to said I-beams 39.

As shown best in FIGS. 3 and 4, the hydraulic lift assembly 32 includes a front scissors means 42 and a rear scissors means 44. The front scissors means 42 includes a first arm member 46 and a second arm member 48 which are substantially identical to each other. The first arm member 46 and the second arm member 48 are connected at approximately their mid-point by a pivot pin 50 which allows arms 46 and 48 to move relative to each other.

A hydraulic or pneumatic cylinder 52 is secured to the thin sheet 30 and one of the I-beams 28 by suitable bolt means 54. A piston 56 extends from cylinder 52 and is secured by suitable pin and shackle means 58 to a predetermined point near one-end of the second arm 48 of the scissors means 42.

The cylinder 52 is provided with a suitable fluid supply line 60 connected to a standard air compressor or air brake system, not shown, or a suitable source of hydraulic fluid under pressure.

Suitable bracket means 62 secured to I-beam 39, is pivotally attached to one-end of arm 48. A roller 64 is attached to the opposite end of arm 48 and rests on plate member 30.

Suitable bracket means 66 is pivotally attached to one-end of arm 46 and a roller 68 is attached to the opposite end of arm 46. The bracket 66 is secured by suitable means to plate member 30 and to I-beam 28. A rack 70 extends through a guide aperture 71 in plate 30 and guide 73 (see FIG. 3) on I-beam 28 and is secured by suitable pin means to arm 46 at a predetermined point for the purpose described below.

The rear scissors means includes two arm members 72 and 74 which are substantially identical to each other and to arm members 46 and 48. Arm members 72 and 74 are connected at approximately their mid-points by a pivot pin 75 which allows the arms to move relative to one another. The first arm member 72 has a bracket 76 attached to one-end and a roller 78 attached to its opposite end. Bracket 76 is secured to thin plate member 30 and one I-beam 28 by suitable means.

Bracket means 84 is pivotally attached to one-end of arm 74 and a roller 86 is secured to its opposite end and rests on plate 30. A rack 80 is attached by pin 82 to arm 72 at a predetermined point and extends through guide aperture 81.

A shaft 88 rotatably supported by bearings 89 extends longitudinally between racks 70 and 80. Shaft 88 carries gears 90 and 92 fixed at its opposite ends. As shown best in FIGS. 3 and 4, gear 90 operatively engages rack 70 and gear 92 operatively engages rack 80.

In operation, air or hydraulic fluid is pumped by the standard air compressor of an air brake system or source of pressurized hydraulic fluid (not shown) through the fluid supply line 60. The fluid pressure causes the piston rod 56 to extend upwardly. As the piston rod 56 moves upwardly it forces one end of the arm 48 to push against the floor assembly 18 and the opposite end of arm 48 and roller 64 to move inwardly. The scissors arm 46 moves upwardly in unison with arm 48 and thus causes upward movement of rack 70. This action drives gear 90 which, in turn, drives shaft 88.

Further, as shaft 88 rotates the teeth of gear 92 operatively engage the teeth of the rack 80 thereby causing the rack to extend upwardly forcing roller 78 of arm 72 to press against an I-beam 39 of floor assembly 18 for lifting floor assembly upwardly.

Figure 8:
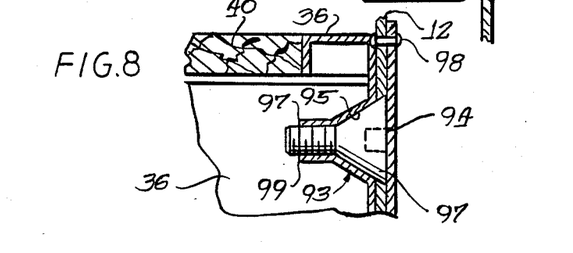
FIG. 8 is an assembled view of FIG. 7.

When the floor assembly 18 is lifted to its desired position, a locking pin 94 or screw is inserted through an aperture 19 in side panel 12 and aperture 37 of floor side rail 36 as shown in FIGS. 6–8. A cover plate 96 is pivotally secured by pin 98 to side panel 12. After screw or pin 94 is inserted through apertures 19 and 37, the cover plate 96 is manually positioned over the locking screw 94 thereby securing the screw 94 in place.

As shown in FIGS. 6–8, the aperture 37 is defined by a socket member 93 having a conical seat portion 95 and a threaded end portion 97 for receiving complementary conical head portion 97 and threaded shank portion 99 of the screw 94. In addition, each aperture 19 in the vehicle side wall is defined by a conical seat or surface effectively providing a projection or continuation of the seat 95. Thus, when the screw head is firmly seated against surfaces 95 and 19, the floor assembly will be rigidly secured with respect to and supported by the side wall of the vehicle and the load of the floor assembly will thus be removed from the lifting means. This arrangement provides for a secure retention of the floor assembly in the desired adjusted position. It is to be understood that if desired, rows of the complementary screws 94 and socket members 93 may be provided along opposite sides of the trailer body and at different elevations so that the floor assembly may be secured at any of one or more desired elevated positions.

Figures 9, 10:
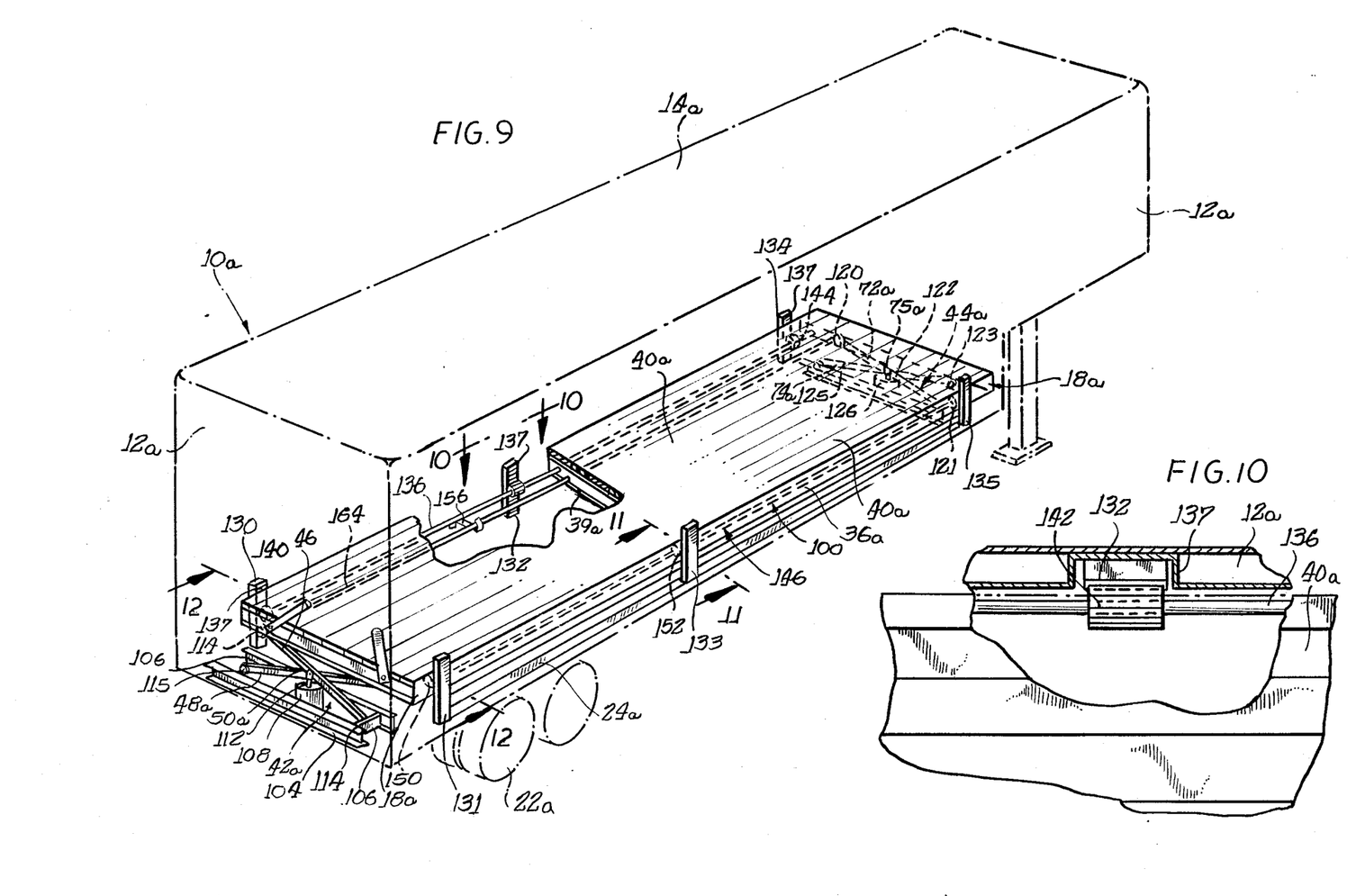
FIG. 9 is a perspective view, partially broken away, showing a trailer body incorporating features of a second embodiment of the present invention.
FIG. 10 is an enlarged fragmentary sectional view taken along line 10—10 of FIG. 9.

FIGS. 9–13 show a second embodiment of this invention in which like elements are designated with the same reference numerals with a suffix a. As shown in FIG. 9 the trailer body 10a includes rectangular side panels 12a. The side panels include a plurality of side wall posts 11. The trailer body also includes a top panel or roof 14a supported on a plurality of transversely extending and spaced apart I-beams or similar beams (not shown).

Figure 11:
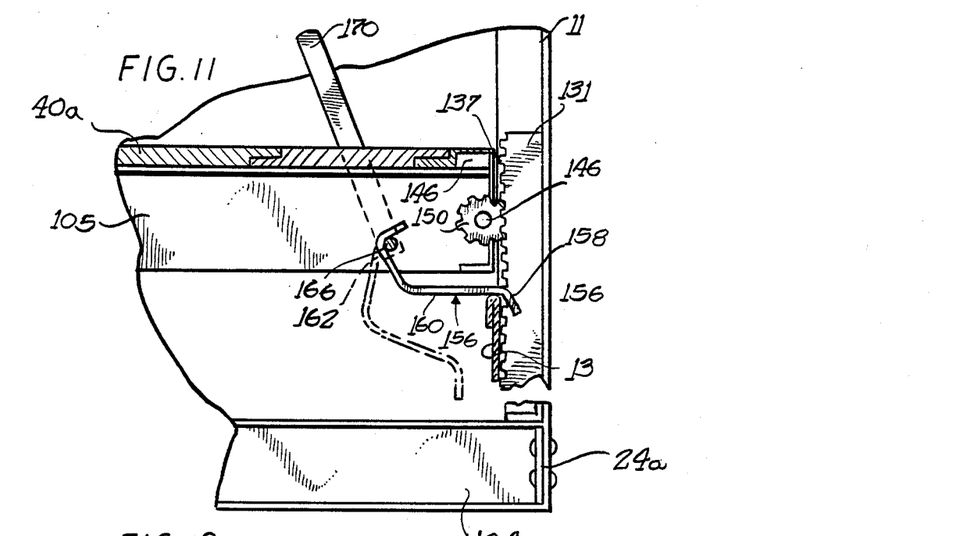
FIG. 11 is an enlarged fragmentary sectional view taken along line 11-11 of FIG. 9.
Figure 12:
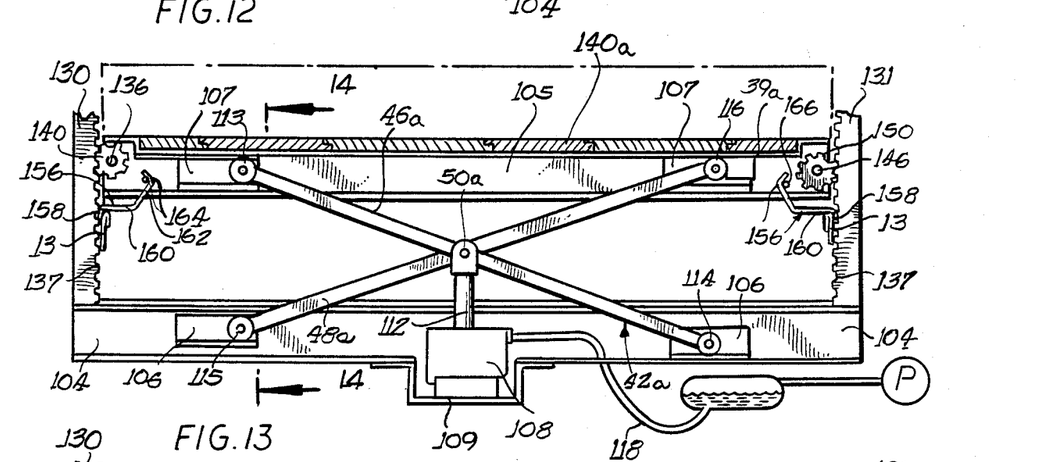
FIG. 12 is an end view showing the floor assembly of the trailer body in an elevated position.
Figure 13:
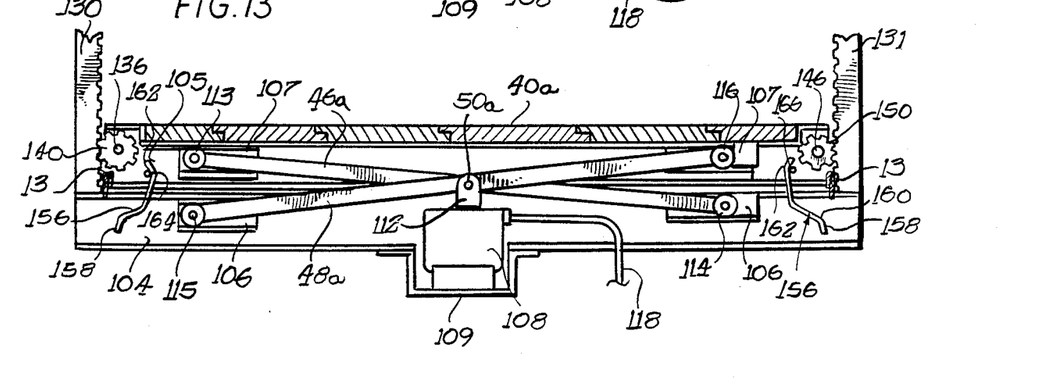
FIG. 13 is an end view showing the floor assembly of the trailer body in a lowered position.

As shown in FIGS. 11–13 the side walls 12a also include side wall supports 13 which are welded to the side wall posts 11. Side wall supports 13 extend the entire length of the trailer body. The purpose of these side wall supports will be discussed in detail below.

The trailer body 10a and the floor assembly 18a are secured by suitable means to a rectangular frame assembly 20a which in turn is secured to wheel assembly 22a.

The frame assembly 20a includes a pair of longitudinally extending and laterally spaced apart side rails 24a which are joined at their common opposite ends by transverse front and rear frame cross sill members 104 having roller channel 106.

The floor assembly 18a includes a pair of longitudinally extending and laterally spaced apart floor side rails 36a. The floor side rails 36a are joined at their common opposite ends by suitable means such as transverse floor end members or cross sills 105 thereby defining a substantially rectangular frame. As shown best in FIGS. 12 and 13 the front and rear floor cross sills 105 include roller channels 107. A plurality of transversely extending I-beams or floor joyces 39a are spaced longitudinally of said frame and are suitably joined to side rails 36a as shown in FIG. 9.

A plurality of floor boards 40a are spaced transversely of said floor beams 38a and are suitably bolted or secured to said I-beams 39a.

As shown best in FIG. 9 lift means 100 for elevating and lowering the floor assembly are positioned between the frame assembly 20a and the floor assembly 18a. The lift means 109 includes a front scissor means 42a and a rear scissors means 44a. The front scissor means 42a includes a first arm member 46a and a second arm member 48a.

The first arm member 46a and the second arm member 48a are connected to each other at approximately their mid-point by a pivot pin 50a which allows arms 46a and 48a to move relative to each other.

A first extendable fluid or air bag 108 of known construction is secured to a channel 109 that is positioned underneath the frame assembly 20a. The bag 108 is positioned beneath the mid-point of arm members 46a and 48a. A piston rod 112 extends vertically from the top of the air bag 108 and is secured to the mid-points of the first arm and second arm members 46a and 48a by pivot pin 50a thereby allowing arms 46a and 48a to move relative to each other.

The bag 108 is preferably filled with anti-freeze or the like. The air bag 108 is provided with a suitable fluid supply line 118 connected to a source of the anti-freeze or other fluid under pressure (not shown).

Figure 14:
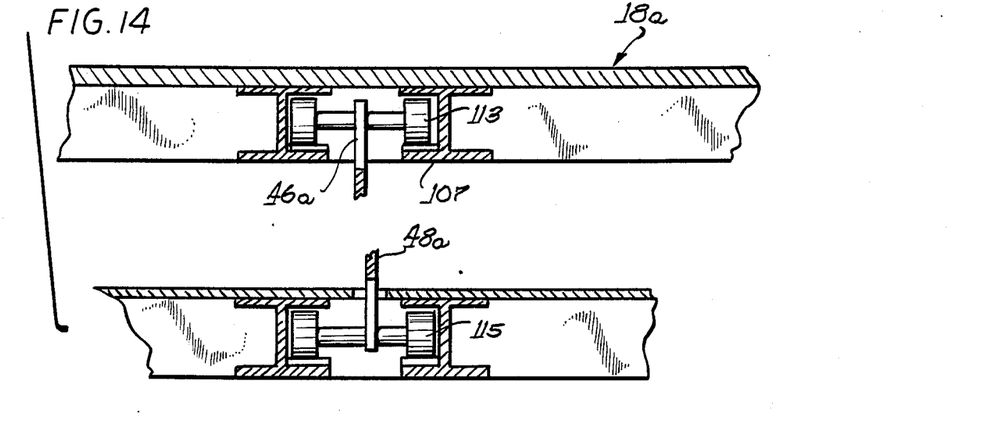
FIG. 14 is an enlarged fragmentary sectional view taken along line 14—14 of FIG. 12.

As shown best in FIGS. 12, 13 and 14 a roller 113 is attached to one end of arm 46a and roller 114 is attached to the other end of arm 46a. Roller 113 is positioned in the roller channel 107 of the of the floor assembly 18a and roller 114 is positioned in roller channel 106 of cross sill 104 of the frame assembly 20a.

In addition, roller 115 is attached t one end of arm 48a and roller 116 is attached to the other end of arm 48a. Roller 116 is placed in the roller channel 107 of the cross sill 105 of the floor assembly 18a. Roller 115 is positioned in roller channel 106 of cross sill 104 of the frame assembly 20a.

As shown in FIG. 9 the rear scissors means 44a includes two arm members 72a and 74a which are substantially identical to arms 46a and 48a of first scissors means 42a. Arms 72a and 74a are connected at approximately their mid-points by pivot pin 75a.

A roller 120 is attached to one end of arm 72a and roller 121 is attached to the other end of arm 72a. Similarly, roller 123 is attached to one end of arm 74a and roller 125 is attached to the other end of arm 74a.

Rollers 120 and 123 of first and second arms 72a and 74a are placed in roller channels 107 of cross sill 105 at the rear end of the floor assembly. Rollers 121 and 125 of first and second arms 72a and 74a respectively are positioned in roller channels 106 of cross sill 104 of the rear end of frame assembly.

A rear lift means or hydraulic air bag 122 identical to bag 108 is secured to a channel below the frame assembly not shown. This channel is substantially identical to channel 109. Bag 122 is positioned beneath the mid-point of first and second arm members 72a and 74a. The piston rod 124 extends vertically from the top bag 122 and is connected by pivot pin 75a to approximately the mid-point of first and second arm members 72a and 74a respectively, thereby allowing arms. 72a and 74a to move relative to one another. The bag 122 is provided that a fluid supply line connected to a source of anti-freeze material or the like under pressure (not shown).

As shown best in FIG. 9 a front rack 130, middle rack 132 and rear rack 134 are recessed in the lower portions of one of the side walls 12a at spaced intervals.

In addition, a front rack 131, middle rack 133 and rear rack 135 are recessed in the lower portions of the opposite side wall 12a and directly across from corresponding front rack 130, middle rack 132 and rear rack 134, respectively. The racks include a pluralty of teeth 137. A gear shaft 136 extends longitudinally along one side of the trailer 10a. The shaft 136 is connected by suitable means (not shown) to the I-beams 39a of the floor assembly 18a. Shaft 136 carries front gear or pinion 140, middle gear or pinion 142 and rear gear or pinion 144. Gears 140, 142 and 144 are aligned on the shaft to engage the teeth 137 of racks 130, 132 and 134, respectively.

Similarly, a gear shaft 146 extends longitudinally along the other side of the trailer. Shaft 146 carries front gear or pinion 150, middle gear or pinion 152 and rear gear 154. Gears 150, 152 and or pinion 154 are aligned on the shaft 146 to engage the teeth 137 of racks 131, 133 and 135.

A plurality of floor supports 156 are positioned at spaced intervals along each side of the trailer as shown in FIG. 9. Each floor support 156 has a finger 158 at one end, a leg portion 160 extending longitudinally from said finger and an angle portion 162. The angle portion 162 is substantially V-shaped. The fingers 158 of the floor support 156 are adapted to engage and be supported by the side wall support 13 as shown best in FIG. 11.

The floor assembly 18a includes support shafts 164 and 166 which engage and are welded to the inside of the V-shaped portion 162 of the support angle 158.

Support shaft 164 extends the full length of one side of the trailer and is positioned adjacent the shaft 136. Shaft 164 is mounted by suitable means (not shown) to I-beams 39a of the floor assembly 18a.

Similarly, shaft 166 extends longitudinally the full length of the other side of the trailer. Shaft 166 is positioned adjacent to the shaft 146 and is mounted by suitable means (not shown) to I-beams 39a of floor assembly 18a.

As shown in FIGS. 9 and 11 levers 168 and 170 are attached to common ends of shafts 164 and 166, respectively.

In operation the air bags 108 and 122 are filled with anti-freeze or the like through a fluid supply line. The fluid pressure in the air bags 108 causes the piston rods 112 and 124 to simultaneously extend causing the front scissor means 42a and the rear scissors means 44a to move in unison and push the floor 18a to a raised or elevated position.

As shown in FIG. 12 as piston 112 extends upwardly first arm 46a and second arm 48a move inwardly or towards the middle of the trailer 10a. Rollers 113 of the first arm 46a and roller 116 of second arm 48a roll towards the middle of the trailer in roller channel 107 of front cross sill 105 of the floor assembly 18. Similarly rollers 114 and 115 of the first and second arm members 46a and 48a also roll toward the middle of the trailer 10a in roller channel 106 of the front cross sill 104 of the frame assembly 20a.

At the same time piston rod 122 also extends upwardly forcing first arm member 72a and second arm member 74a of the rear scissors means 44a to move inwardly. Roller 120 of the first arm 72a and roller 123 of second arm 74a roll towards the middle of the trailer in roller channel 107 of rear cross sill. In addition, roller 121 of first arm 72a and roller 125 simultaneously roll towards the middle of the trailer in roller channel 106 of cross sill 104. As the front scissors means 42a and the rar scissors means 44a move in unison toward the middle of the floor, the floor is pushed to the raised position as shown by the dotted line in FIG. 12.

As the floor assembly 18a moves to the raised or elevated position, drive shafts 136 and 146 move with the floor and the gears attached to each of these shafts engage the teeth of the corresponding rack.

This rack and pinion arrangement with drive shafts 136 and 146 on each side of the trailer keeps the floor assembly 18a level. Specifically, it keeps the center of the area of the floor from sagging during the raising and lowering mode.

As shown best in FIG. 12, once the floor has been raised to the dotted line position, the levers 168 and 170 which are attached to support shafts 164 and 166 respectively are manually pulled for rotating the shaft 164 and 166 and thereby moving floor supports 156 direction of their respective walls the floor supports 156 to rotate 90° as shown in FIGS. 11 and 12 so that the finger portions 158 engage the wall supports 13 of the side Walls 12a. This enables the floor supports 156 to remain in place. The floor assembly 18a is then lowered to securely rest on the floor support 156.

In order to lower the floor the floor assembly 18a is again raised to the dotted line position as shown in FIG. 12. Levers 168 and 170 are manually pulled for retracting and disengaging finger portions 158 of the floor supports 156 from the side wall support 13. This allows the floor support 158 to rotate 90° towards the frame assembly and the floor can be lowered to the position shown in FIG. 13.

The use of the anti-freeze material or the like in air bags 108 and 122 allows the air bags 108 and 122 to compress and decompress quicker than if the bags were filled only with air since the liquid is incompressible thereby allowing the floor to be raised and lowered much faster.

Figure 15:
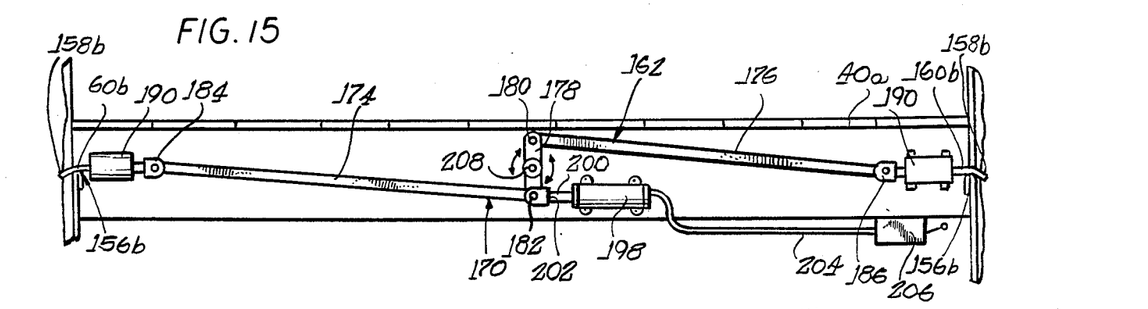
FIG. 15 is an enlarged sectional view of the trailer body incorporating features of another embodiment of the present invention.
Figure 16:
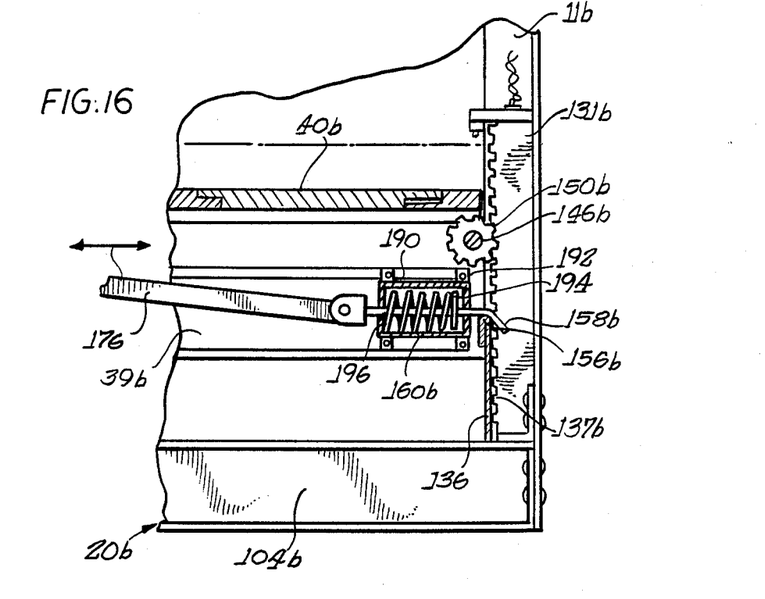
FIG. 16 is an enlarged fragmentary view of FIG. 15.

Turning now to FIGS. 15-16 there is shown a third embodiment of this invention, in which like elements are designated by the same reference numerals with the suffix "b". This embodiment includes all of the structures of FIGS. 9-14 except for changes in the floor locks or support 156b and their associate operating mechanism. As shown best in FIG. 15 the third embodiment of this invention includes a plurality crank means 172 for automatically extending and retracting floor supports 156b.

A plurality of first and second floor supports 156b are positioned of spaced intervals along each side of the trailer. The first floor supports 156b are positioned along one side of the trailer and the second floor support 156b are positioned on the other side of the trailer and directly across from the first floor support 156b. The floor supports 156b include a finger 158b and a leg portion 160b. Fingers 158b of a floor supports 156b are engagable with and adapted to be supported by side wall support 13b as shown in FIGS. 15 and 16. The first and second floor supports 156b are connected by the crank means 172.

The crank means 172 includes a first rod member 174 and second rod member 176. The first and second rod members 174 and 176 are connected at their common ends to opposite ends of a crank arm member 178 by suitable means 180 and 182 respectively.

The other end of the first rod member 174 is connected to one end of leg 160b of the floor support 156b by suitable pin and shackle means 184.

Similarly, the other end of the second rod 176 is connected to one end of leg 160b of a floor support 156b which is across from the first floor support 156b by suitable pin and shackle means 186.

A support guide 190 slidably receives leg portion 160b of floor support 156b. The guide 190 includes a box like structure which is secured by a suitable means 192 to I-beam 39b of floor assembly 18b.

As shown in FIG. 16 a washer 194 is fixed to leg portion 160b of the floor support 156b. A coil spring 196 encircles positioned so that one end abuts one end of the the guide 190 and the other end abuts the washer 194.

The crank means 172 also includes a cylinder 198. A piston rod 200 extends laterally from cylinder 198 and is connected to one end of the arm 178 of one of the crank means 172 by pin and shackle means 202. The cylinder is supplied with a suitable fluid supply line 204 which is connected to a source of hydraulic or pneumatic fluid under pressure through a control valve 206. The cylinder 198 is also connected to one of the I-beams of floor assembly 18b.

A crank shaft 208 extends through the center of each of the crank arms 178 of the crank means 172. The crank shaft 208 enables all of the crank means 172 which are spaced along the trailer to move in unison.

In order to lower the floor to a desired position, the floor is first raised to the dotted line position as shown in FIG. 16. As the floor assembly 18a is raised the crank means 172 is also raised so that the finger 158b of the floor support 156b disengages the wall support 13b. The cylinder 198 is activated and the release of pressurized fluid causes the piston rod 200 to withdraw thereby rotating the arm 178 of the crank means in a counterclockwise position as shown in FIG. 15. As the arm 176 rotates the shaft 208 simultaneously rotates thereby causing each arm member 178 of each crank means 172 to rotate in unison.

As arm member 178 rotates the first and second rod members 174 and 176 of each crank means 172 are pulled in unison toward the middle of the trailer thereby pulling the fingers 158b of the floor support 156b away from the side wall support 13b. As the floor support 156b moves toward the middle of the trailer, the washer 194 compresses the coil spring 196. The finger 158b of the floor support 156b clears the side wall support 13b the floor assembly 18b can be lowered to the desired position.

To raise the position to the desired elevated level, the floor assembly 18a is raised to the dotted line position as shown in FIG. 16 so the floor supports 156b are above the wall supports 13b. The cylinder 198 is activated to permit the springs 196 to return the floor supports 156b to their extended position for overlaying and engaging the support rails 13b. The floor assembly 186 is then lowered to securely rest on the floor supports 156b.

While three embodiments of the invention have been shown, it should be understood, of course, that the invention is not limited thereto, since many modifications may be made. It is, therefore, contemplated to cover the present invention and any such modification as follows in the true spirit and scope of the appended claims.

The invention is claimed as follows:

1. A vehicle comprising a pair of laterally spaced side walls having side wall supports attached thereto, a frame assembly having a pair of longitudinally extending side rails, said side rails being joined at their common opposite ends by frame cross sill members having roller channels therein, a floor assembly having a pair of longitudinally extending side rails, said side rails being joined at their common opposite ends by floor cross sill members, each of said cross sill members having roller channels therein, and lift means for elevating and lowering said floor assembly on said frame assembly, said lift means defining first and second scissors means each having a first arm member and a second arm member pivotally joined substantially at their mid-portions and having a roller attached to each end thereof, said rollers attached to opposite ends of said first and second arm members of said first and second scissor means being positioned in said roller channels of said floor cross sill and said rollers attached to the other ends of said first and second arm members of said first and second scissor means being positioned in said roller channels of said frame cross sills, and a plurality of racks recessed at spaced intervals in a lower portion of each said side wall and a first and second gear shaft connected to said floor assembly, said first gear shaft extending longitudinally and adjacent to one side wall and said second gear shaft extending longitudinally and adjacent to said other side wall, each of said gear shafts being attached to said floor assembly by suitable means and carrying gears engagable with said racks, and first and second actuating means, said first actuating means connected between said frame assembly and said floor assembly on said first and second arm member of said first scissor means at approximately their mid-portions and said second actuating means connected between said frame assembly and said floor assembly on said first and second arm member of said second scissors means at approximately their mid-portions for selectively raising and lowering said floor assembly.

2. A vehicle of claim 1 which includes a plurality of floor supports for supporting said floor assembly in an elevated position.

3. A vehicle of claim 2 wherein said floor supports are rotatably mounted on a first and second support shaft connected by suitable means to said floor assembly, said first support shaft extending longitudinally along one of said side walls and adjacent said first gear shaft and second support shaft extending longitudinally along the other of said side walls and adjacent to second gear shaft, said floor supports including fingers engagable with said side wall supports for supporting said floor assembly in an elevated position.

4. A vehicle of claim 3 wherein each of said support shafts includes a lever at common ends for manually rotating each of said support shafts causing said floor supports to rotate in unison between an upper and lower position, when the floor supports are rotated to an upper position said finger engages said side wall support and said floor assembly rests on said floor support when said floor supports are rotated to a lower position the finger disengages said side wall supports and the floor assembly can be lowered to a desired position.

5. A vehicle of claim 1 which includes a plurality of first and second floor supports, each of said first floor supports being positioned along one side wall and each of said second floor supports being positioned along the other side wall, each said first and second floor supports being connected by crank means which are attached to said floor assembly for automatically shifting said floor supports between an extended and retracted positions to support the floor assembly in an elevated position or allow the floor assembly to be lowered to a desired position.

6. A vehicle of claim 5 wherein said crank means are connected by a crank shaft for selectively raising and lowering said floor supports in unison.

7. A vehicle of claim 5 wherein each of said floor supports includes finger members engagable with said side wall supports when said floor supports are in said extended position for supporting floor assembly rests in an elevated position.

8. A vehicle comprising a pair of laterally spaced side walls having side wall supports attached thereto, a frame assembly, a floor assembly, and lift means for elevating and lowering said floor assembly on said frame assembly, said lift means defining first and second scissors means each having a first arm member and a second arm member pivotally joined substantially at their mid-portions, and a plurality of racks at spaced intervals along each said side wall and a first and second gear shaft connected to said floor assembly, said first gear shaft extending longitudinally and adjacent to one side wall and said second gear shaft extending longitudinally and adjacent to said other side wall, each of said gear shafts being attached to said floor assembly by suitable means and carrying gears engagable with said racks, and first and second actuating means, said first actuating means connected between said frame assembly and said floor assembly on said first and second arm member of said first scissor mans at approximately their mid-portions and said second actuating means connected between said frame assembly and said floor assembly on said first and second arm member of said second scissors means at approximately their mid-portions for selectively raising and lowering said floor assembly.

9. A vehicle comprising a mobile frame, side and top walls on said frame defining a cargo compartment of predetermined width and height, a floor assembly movable between a lowered positioned and a raised position for adjusting the height of said compartment, lifting means between said frame and said floor assembly for raising and lowering said floor assembly, and retractable support means for supporting said floor assembly in the raised position, said support means including a shaft rotatably carried on said floor assembly and a plurality of finger elements carried by said shaft and movable between extended supporting positions and retracted in operative positions upon rotating of said shaft.

10. A vehicle comprising a mobile frame, side and top walls on said frame defining a cargo compartment of predetermined width and height, a floor assembly movable between a lowered position and a raised position for adjusting the height of said compartment, lifting means between said frame and said floor assembly for raising and lowering said floor assembly, and retractable support means supporting said floor assembly in the raised position, said support means including a plurality of finger elements movable between extended support positions and retracted inoperative positions, and crank means operatively connected with said finger elements for simultaneously shifting said finger elements between said extended and retracted positions.

11. A vehicle comprising a mobile frame, side and top walls on said frame defining a cargo compartment of predetermined width and height, a floor assembly movable between a lowered position and a raised position for adjusting the height of said compartment, lifting means between said frame and said floor assembly for raising and lowering said floor assembly, and retractable support means for supporting said floor in the raised position, including a plurality of upstanding racks spaced along said side walls, shaft means rotatably carried by said floor assembly, and a plurality of gears fixed on said shaft means and respectively engagable with said racks for promoting uniform movement of all portions of the floor assembly between said raised and lowered positions.

* * * * *

UNITED STATES PATENT AND TRADEMARK OFFICE
CERTIFICATE OF CORRECTION

PATENT NO. : 4,943,204

DATED : July 24, 1990

INVENTOR(S) : Rodney P. Ehrlich

It is certified that error appears in the above-identified patent and that said Letters Patent is hereby corrected as shown below:

Column 2, Line 55  "weather shield" it should be  -- weather shield.--

Column 5, Line 31  "attached t one end" it should be -- attached to one end --

Column 5, Line 60  " allowing arms. 72a" it should be  -- allowing arms 72a --

Column 6, Line 67  " the rar " it should be-- the rear --

Column 7, Line 20  "Walls 12a." it should be  -- walls 12a. --

Column 8, Line 9  "encircles positioned so" it should be
-- encircles the leg 160b of the floor support 156b. The sping is positioned so --

UNITED STATES PATENT AND TRADEMARK OFFICE
CERTIFICATE OF CORRECTION

PATENT NO. : 4,943,204

DATED : July 24, 1990

INVENTOR(S) : Rodney P. Ehrlich

It is certified that error appears in the above-identified patent and that said Letters Patent is hereby corrected as shown below:

Column 10, Line 21 "scissor mans at" it should be -- scissor means at --

Signed and Sealed this

Eighth Day of September, 1992

Attest:

DOUGLAS B. COMER

Attesting Officer

Acting Commissioner of Patents and Trademarks